Figure 1:
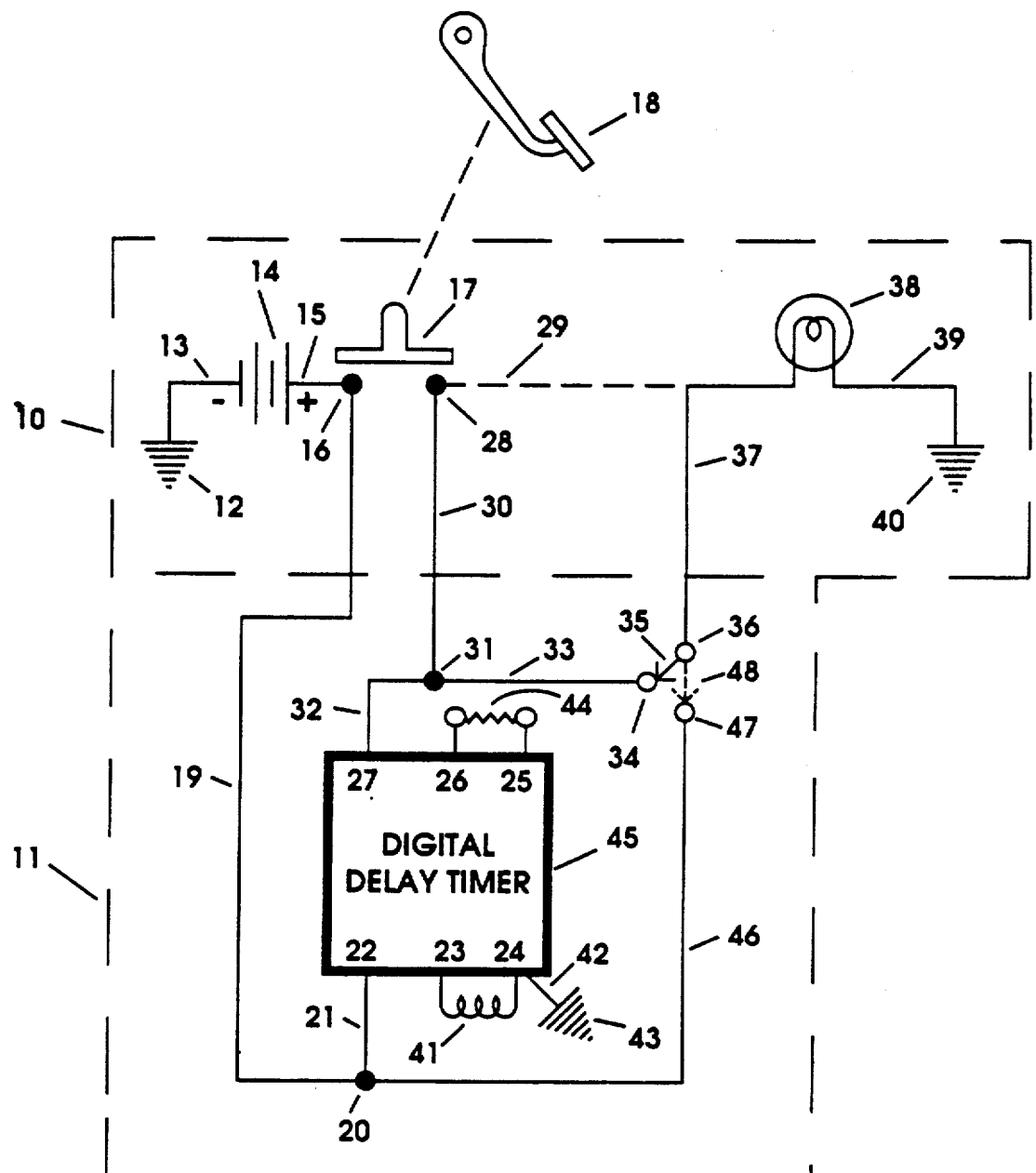

United States Patent [19]

Lee

[11] Patent Number: 4,990,887
[45] Date of Patent: Feb. 5, 1991

[54] VEHICLE BRAKE LIGHT SYSTEM

[76] Inventor: Robert Lee, 5925 N. Union Blvd., Colorado Springs, Colo. 80918

[21] Appl. No.: 436,689

[22] Filed: Nov. 15, 1989

[51] Int. Cl.$^5$ .................................................. B60Q 1/44
[52] U.S. Cl. .................................. 340/479; 340/463; 340/309.3
[58] Field of Search ............... 340/479, 468, 463, 464, 340/309.15, 309.3

[56] References Cited

U.S. PATENT DOCUMENTS

| | | |
|---|---|---|
| 3,576,527 | 4/1971 | Howard . |
| 3,693,151 | 9/1972 | Hasegawa et al. . |
| 3,914,739 | 10/1975 | Caughlin et al. . |
| 4,346,365 | 8/1982 | Ingram . |
| 4,663,609 | 5/1987 | Rosatio . |

*Primary Examiner*—Donnie L. Crosland
*Attorney, Agent, or Firm*—Phillip A. Rein

[57] ABSTRACT

This invention relates to a vehicle brake lighting system having a novel brake delay lighting system utilized with a conventional vehicle brake lighting system. The conventional vehicle brake lighting system includes a battery member being a power source connected through a brake pedal switch to brake light members. Depression of a brake pedal closes the brake pedal switch to energize the brake light members in a conventional manner. The brake delay lighting system includes a delay timer member which is interconnected by a timer circuit means to the conventional vehicle brake lighting system. The delay timer member is operable on release of contact with the brake pedal and opening of the brake pedal switch to provide for the continued illumination of the brake light members for a set time period such as plus or minus eight seconds. The brake delay lighting system is provided with a fail-safe system so that the conventional vehicle brake lighting system continues to operate in a normal conventional manner even on mechanical or electrical failure of the brake delay lighting system. The brake delay lighting system automatically resets to zero if the brake pedal is depressed during a timing cycle and again times out after release of the brake pedal for the full time cycle.

12 Claims, 1 Drawing Sheet

VEHICLE BRAKE LIGHT SYSTEM

FIELD OF INVENTION

This invention relates generally to a brake warning light system for a vehicle and, more particularly, a system that operates brake lights for a set period of time after removal of a driver's foot from a vehicle brake pedal and thus opening of a brake pedal switch.

PRIOR ART

Conventional brake light systems for vehicles in worldwide use provide rear mounted lamps that illuminate bright red whenever a brake pedal is depressed and the lamps are extinguished when the driver's foot is removed from the brake pedal. To improve the effectiveness of brake lights as warning devices, late model automobiles have been provided with an additional brake light, located at an elevated level, being closer to eye level of the driver of a trailing car, and centered on a rear deck of the vehicle. Despite such wide spread improvements, rear end collisions continue to occur with substancial frequency, indicating that there is room for improvement.

One significant drawback of prior art brake light systems is their failure to address a hazardous situation of a road traveling vehicle which is momentarily in a slowed condition, relative to the speed of a trailing vehicle. Drivers will commonly find themselves in such a momentary, yet hazardous position when they have, for example, slowed for a road obstruction, poor visibility, or other reason and subsequently released the brake pedal in preparation for resuming normal driving speed. The time period from release of brakes through acceleration to the speed of trailing vehicle traffic flow, represents a momentarily hazardous period, during which there is a need to alert the driver of a trailing vehicle which heretofore has not been provided. Other commonly occurring situations in which a vehicle is momentarily slowed and imperiled are experienced when:

1. vehicle is stopped at traffic light or stop sign. When light goes green or vehicle starts to pick up from a dead stop, onrushing traffic in the rear needs the delay brake lights to warn that vehicles (s) have not resumed normal speed yet.

2. when vehicle slows down to round a corner onto another street, oncoming cross traffic needs the delay brake lamps to alert them to the momentary slow speed of such a vehicle.

3. when vehicle slows to pull into a driveway and brake is released, delay lights are needed to alert following traffic.

4. when vehicle pulls out from a parked position along a street curb, same logic applies.

5. when vehicle backs out of a diagonal or perpendicular parking space or out of a driveway, brake delay lamps are needed.

6. when vehicle "U" turns, delay lamps are needed.

7. when vehicle slows down on a highway or street due to obstruction or poor visibility, following drivers need the delay brake light warning to realize the danger is still there. In all such situations with the brake light system of this invention, the brake lamps stay illuminated for so many seconds while the driver's foot is on the accelerator pedal, and slowly increasing speed up to normal traffic flow. Thus, in every driving situation, the brake light delay system of this invention provides greater safety by enabling the brake lamps to stay illuminated for a predetermined number of seconds, after the driver's foot is released from the brake pedal when the motorist is accelerating, or backing up.

The following United States patents are of interest:

| U.S. Pat. No. # | Invention | Inventor |
| --- | --- | --- |
| 3,576,527 | SAFETY ALERT FOR AUTOMOBILE BRAKE SYSTEMS | William E. Howard |
| 3,693,151 | INITIALLY INTERMITTENTLY FLASHING BRAKE LAMP CIRCUIT | Hasegawa et al |
| 3,911,394 | VEHICLE BRAKE WARNING LIGHT SYSTEM | Max Shames |
| 3,914,739 | VEHICLE AND BRAKE AND INDICATOR LIGHT CONTROL SYSTEM | Caughlin et al |
| 4,127,844 | VEHICLE STROBE WARNING LIGHT SYSTEM | Francis W. Purdy |
| 4,346,365 | STOPPED VEHICLE WARNING DEVICE | Charles E. Ingram |
| 4,403,210 | BRAKE LIGHT ENHANCER CIRCUIT | Patrick O. Sullivan |
| 4,663,609 | BRAKE ALERT DEVICE | George M. Rosario |

One attempt to provide a more effective brake alert system is disclosed in U.S. Pat. No. 4,663,609 in which depression of a vehicle brake pedal causes brake lights to flash in a manner designed to attract attention of a driver in a trailing vehicle. This system, similar to others, provides an improved attention-getting signal but the brake lamps are extinguished when the brake pedal is released.

A brake light system is disclosed in U.S. Pat. No. 4,403,210 wherein depression of a vehicle brake pedal causes brake lamps to flash on and off a predetermined number of times and, thereafter, remain continuously illuminated until the brake pedal is released, or until the vehicle turn signal lever is moved left or right. This invention similarly fails to address the special hazards of the slowed vehicle since releasing the brake pedal deenergizes the brake lights.

Another vehicle brake warning light system is addressed in U.S. Pat. No. 3,911,394 in which vehicle brake lamps are operated for a given period of time in response to the lifting of the driver's foot from an accelerator pedal. While this system provides an early warning signal that slowing is about to occur, it does not protect a slowed vehicle in the process of gathering speed.

U.S. Pat. No. 3,693,151 discloses a flashing brake lamp circuit to cause a flashing of brake lamps while a brake pedal is depressed but not continuing the flashing function after the brake pedal is no longer depressed.

The other above cited U.S. patents disclose vehicle brake light systems with a depression of a brake pedal causing initially flashing brake lights but are not provided with illuminated brake lamps for a set time period after the brake pedal is no longer depressed.

None of the aforementioned prior art patents protect a vehicle and driver when the foot is transferred from the brake to the accelerator pedal and the vehicle is gathering speed by having a delay-off illumination action of the brake lamps.

PREFERRED EMBODIMENT OF THE INVENTION

In one Preferred embodiment of this invention, a vehicle brake light system is provided including a conventional vehicle brake lighting system having a brake delay lighting system connected thereto. The conventional vehicle brake lighting system is normally found in a vehicle having a power source such as a battery member connected through a brake pedal switch to brake light lamps or members mounted on a rear portion of a vehicle. The brake pedal switch is normally moved to a closed condition on depression of a brake pedal to provide power from the battery member to the brake light members to achieve illumination thereof. The brake delay lighting system of this invention is connected to the conventional vehicle brake lighting system to provide a delay feature whereupon the brake light members continue to be illuminated for a predetermined time period after ceasing depression, or release of the brake pedal member, thus moving the brake pedal switch to an opened condition. The brake delay lighting system includes a delay timer member connected through a timer circuit means to the conventional vehicle brake lighting system. The delay timer member is of a conventional nature, provided with an external set of terminals so the user may change or select the delay time in seconds by selection of a resistor value connected to these two terminals. The delay timer member is provided with a set of relay transfer contacts (SPDT), which enables the brake lamps to function in a normal conventional (non/delay) manner, should the timer or its relay ever fail electrically, electronically or mechanically to operate, thus never leaving the driver without protection even if the system should break down.

OBJECTS OF THE INVENTION

One object of this invention is to provide a vehicle brake light warning system having rearwardly projecting illuminated warning lamps in situations where a vehicle is momentarily in a slowed condition with the brake pedal released and normally in an accelerated condition up to normal traffic speed, or slowed down, about to park.

Another object of this invention is to provide a vehIcle brake light system wherein vehicle brake light members will be illuminated as long as a brake pedal is engaged and continue subject illumination an additional period of time following release or contact with the brake pedal.

One other object of this invention is to provide an improved vehicle brake light system which can be provided in original manufactured vehicles or as a kit to be installed on existing vehicles.

One further object of this invention is to provide a brake delay lighting system mountable in a vehicle equipped with a conventional battery; brake pedal with a normally opened brake pedal switch; and rear mounted brake lamps.

Still, one other object of this invention is to provide a vehicle brake light system to achieve vehicle operation safety which is reliable in operation, easy to install, economical to manufacture, and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a circuit diagram of a brake delay lighting system of this invention, connected to an existing conventional vehicle brake lighting system.

The following is a discussion and description of preferred specific embodiments of the vehicle brake light system of this invention, such being made with reference to the drawings, whereupon the same reference numerals are used to indicate the same or similar parts and/or structure. It is to be understood that such discussion and description is not to unduly limit the scope of this invention.

DESCRIPTION OF THE INVENTION P Referring to the drawing in detail, of FIG. 1, a vehicle brake light
system of this invention, indicated generally at 10,
includes a conventional vehicle brake lighting system,
having a vehicle brake delay lighting system 11
connected thereto. The conventional brake lighting
system 10 includes:

1. a power source or battery member 14.
2. a brake pedal switch or brake switch means 17 operated by brake pedal 18, connected to the battery member 14
3. a brake light member or warning lights 38, connected to the brake pedal switch 17 to be energized on depression of a brake pedal 18. Although only one brake light member 38 is shown, it is noted that a plurality can be used such as two to five or more, being rear mounted and one in the rear window of the vehicle.

The battery member 14 is connected by an electrical conductor, wire, or line 13 to a ground 12 which may be the vehicle chassis.

The brake pedal switch 17 and the brake pedal 18 collectively comprise a brake assembly.

The brake pedal switch 17 operates to be connected to the battery member 14 through a line 15 to a terminal 16. The switch member 17 is operable in a depressed condition to transfer electrical flow from terminal 16 to a terminal 28. The terminal 28 in the vehicle brake lighting system 10, without the vehicle brake delay lighting system 11, would normally be connected by line 29 to the brake light member 38, but such line 29 is deleted in the application of this invention for reasons to become obvious.

The brake light member 38 is connected by a line 39 to the vehicle chassis or ground 40.

The vehicle brake delay lighting system 11 includes a delay timer member 45 interconnected by a timer circuit means to the conventional vehicle brake lighting system 10 in a manner to be explained. The delay timer member 45 is provided with terminals 22, 23, 24, 25, 26 and 27.

Details of the structure and operation of the delay timer member 45 are not necessary as known in the prior art. In fact, the delay timer member 45 is a type known as the KSDB (delay on break, or delay-off) Solid State Timer manufactured by SSAC, Inc. of Baldwinsville, N.Y., as well as other such companies, as described in Brochure No. B117, and is utilized in this invention. The delay timer member 45 is known in the prior art and is operable on closure of a switch member such as the brake pedal switch 17, to energize a load such as a brake light member 38. By subsequent opening of a switch member such as the brake pedal switch 17, the delay timer member 45, is operable in a time delay period or delay-off mode, which delay period in seconds has been pre-determined by selection of resistor 44, connected to terminals 25 and 26.

An important feature of the delay timer member 45 is that if the brake pedal 18 should be depressed again at any time during the time delay period, the time delay member 45 will be reset to zero time so that the time delay period will always proceed to its full intended time delay period after removal of foot pressure from the brake pedal 18.

The time delay circuit means 11 includes the terminal 16 interconnected by a line 19 to a terminal 20, connected by line 21 to timer terminal 22, which sets on plus potential at all times. In turn, terminal 20 is connected by a line 46 to the relay terminal 47 which is part of a normally open set of transfer contacts belonging to relay 41, connected to terminals 23 and 24 of delay timer 45.

The terminal 28 is connected by a line 30 to a terminal 31 and then by a line 32 to the terminal 27. In turn, the terminal 31 is connected by a line 33 to a relay terminal 34 which is part of the relay 41 of the delay timer member 45 which will be explained.

The brake light member 38 is interconnected by a line 37 to a terminal 36 which is connected to a pivotal relay arm 35 of relay 41 of the delay timer member 45 operable in a manner to be explained.

The resistor 44 is connected to terminals 25 and 26, being part of the delay timer member 45 which may be adjustable to set the time delay period, in seconds, but once set, it is not normally changed.

The relay coil 41 is connected to terminals 23 and 24, which is operable to move the relay contact arm 35 in a manner to be explained. One side of the relay coil 41, at terminal 24 is grounded through line 42 to ground 43.

USE AND OPERATION OF THE INVENTION

In the use and operation of the vehicle brake light system of this invention, it is noted that the conventional vehicle brake lighting system 10 is utilized whereupon a line 29, which normally connects to point 28, completing the circuit of the brake light member 38, is disengaged and connected to the brake delay lighting system 11 of this invention.

More particularly, the line 19 from the terminal 16 is connected to the terminal 22 through 20 and 21 on the delay timer member 45. The terminal 28 is connected by the line 30, point 31 and line 32 to the terminal 27 on the delay timer member 45 and by the line 33 to terminal 34 and the relay contact lever 35 of the relay member 41.

The brake light member 38 is connected by the line 37 to the terminal 36 and the relay contact lever 35 of the relay member 41.

After connecting the brake delay lighting system 11 to the conventional vehicle brake lighting system 10, it is noted that the brake pedal switch 17, when depressed by brake pedal 18, operates to move downwardly to make electrical contact between terminals 16 and 28. As the line 29 has been removed (cut) at the brake switch, this adds the vehicle plus voltage potential (which is always present at terminals 22 and 47) through terminal 28, line 30, terminal 31, and line 32, placing the battery plus potential on terminal 27. Also from terminal 31 the battery plus potential goes along line 33 to relay contact 34 which is shown in its normal position of the relay contact lever 35. This activates the delay timer member 45 and relay member 41 energizes immediately as soon as plus potential appears on terminal 27, moving the relay contact lever 35 to the position indicated in dashed arrow 48, to complete the circuit through line 19, terminal 20, line 46, relay terminal 47, relay contact lever 35 (now dashed arrow 48) relay terminal 36 and line 37 to the brake light member 38, line 39 and ground 40 to cause tail lamp illumination thereof.

In this condition, the brake light member 38 will remain illuminated as long as the vehicle operator keeps foot pressure on, and depression of the brake pedal 18. After the vehicle operators foot is removed from the brake pedal 18, the delay-off time cycle begins, as relay 41 stays energized, holding relay contact 35 up, as shown in dashed arrow at 48, thus keeping tail lamp 38 illuminated for the duration of the delay time cycle, which would be approximately 8 seconds more or less or per survey determination.

Relay member 41, (or other solid state equivalent part) is necessary due to the fact that the delay timer member 45 has a limited load capacity, such as 2 amps, whereas the brake light member 38 is wired in parallel with all the tail lamps and can draw 12 amps or more.

A unique feature of the vehicle brake light system 11 of this invention is the fact that if the delay timer circuit means 45, or its relay 41, should develop a mechanical or electrical failure and fail to function, the brake light member 38 will continue to function in the normal conventional manner (minus the delay feature) through the relay contact lever 35 in its normal position shown in FIG. 1. In this condition, it is seen that depression of the brake pedal 18 would provide current from the battery member 14, line 15, terminal 16, switch 17 operated, terminal 28, line 30, terminal 31, line 33, terminal 34, relay contact lever 35, terminal 36, line 37, brake light member 38, and through line 39 to ground 40. Therefore, it is noted that failure of the brake delay lighting system 45 or its relay, will not affect the overall safety and operation of the vehicle brake lighting system 10, which is an important fail-safe safety factor of this invention.

Another feature of this invention is that the depressing of the brake pedal 18 during a delay-off time period will place a 12 volt positive potential on terminal 27 and cause the delay timer member 45 to recycle and return to zero time again, ready to time out the instant the operator lifts a foot from the brake pedal 18 a second time or any number of times. This recycle feature is an important point of the invention as it assures that the full time period, or delay-off period will always be initiated each time the vehicle operators foot is released from the brake pedal 18.

A method of operation of the vehicle brake light system 10 of this invention involves these steps:

1. energizing the brake light member 38 on depression of the brake pedal 18 and closing of the brake pedal switch 17.

2. maintaining the energization of the brake light member 38 as long as the brake pedal switch 17 is closed.

3. continuing energization of the brake light member 38 on release of pressure on the brake pedal 18, and opening of the brake pedal switch 17 for a predetermined delay-off time period.

4. resetting or recycling of the delay-off time period back to zero on closing the brake pedal switch 17 while a delay-off cycle is already in operation.

It is noted that the brake delay lighting system of this invention can be readily installed as factory supplied original manufactured equipment, or can be supplied in a kit form which can be easily attached to an existing conventional vehicle brake lighting system on all types of vehicles.

It is seen that the vehicle brake delay lighting system of this invention is easy to install, economical to manufacture, reliable solid state digital circuitry sealed in epoxy, and substantially maintenance free.

While the invention has been described in conjunction with preferred specific embodiments thereof, it will be understood this description is intended to illustrate, and not to limit the scope of the invention, which is defined by the following claims:

I claim:

1. A brake delay lighting system for use with a conventional vehicle brake lighting system on a vehicle equipped with a power source and a brake pedal, comprising:
   (a) warning lights mounted on a vehicle;
   (b) brake switch means closed when a brake pedal is engaged; and opened when the brake pedal is disengaged; and
   (c) said brake delay lighting system having a first input that is connected to the power source, a second input that is connected to said brake switch means to connect with the power source when said brake switch means is closed and a first output connected to said warning lights;
whereby the closing of said brake switch means will cause current flow to said brake warning lights to energize said warnIng lights and, each occasion of the opening of said brake switch means, will initiate a delay-off and a continued flow of current to said brake warning lights for a predetermined period of time.

2. In a vehicle having conventional brake lights, a brake pedal, and a brake pedal switch operated by said brake pedal, a method of using a brake delay lighting system connected between said brake pedal switch and said brake lights for alerting traffic trailing its vehicle to a slowed condition of the vehicle, said method comprising the steps of:
   (a) energizing said brake lights on movement of said brake pedal; and
   (b) maintaining the energizing of said brake lights for as long as said brake pedal is engaged, and continuing to energize said brake lights for a preset period of time beyond an occasion of disengagement of said brake pedal and movement to its original condition.

3. A brake delay lighting system for a vehicle with a foot operated brake assembly, including:
   (a) a power source;
   (b) brake light members mounted on a vehicle and connected in electrical communication with said power source;
   (c) a normally opened brake pedal switch operable to close when a brake assembly is engaged and to open when said brake assembly is disengaged, and electrically connected to said power source;
   (d) a delay timer member connected by a timer circuit means to said brake pedal and said brake light members for controlling operation of said brake light members in response to closing and opening of said brake pedal switch;
   (e) engaging of said brake assembly will cause electrical current to flow through said brake light members for as long as said brake assembly is engaged; and disengaging of said brake assembly will cause said electrical current to flow for a predetermined period of time following the disengagement of said brake assembly; and
   (f) if said brake delay lighting system should fail, said brake light members will revert to conventional operation minus the delay feature providing a vehicle operator with continued protection with operation of said brake light members on the road.

4. A brake delay lighting system used with a conventional vehicle brake lighting system including a power source connected to a brake pedal switch, and a warning light connected to the brake pedal switch, comprising;
   (a) a delay timer member connected by a timer circuit means to a brake pedal switch and a warning light;
   (b) said timer circuit means includes a first input connected to a power source and said delay timer member, a second input connected to said brake pedal switch and said delay timer member, and a first output connected from said delay timer member to said warning light;
whereby closing of said brake pedal switch will cause current to flow to said warning light to illuminate said warning light, and subsequent opening of said brake pedal switch will initiate a delay-off and a continued flow of said current to said warning light for a predetermined period of time.

5. A brake delay lighting system as described in claim 4, wherein:
   (a) said timer current means having said second input connected by a second output to said delay timer member and said warning light;
whereby closing of said brake pedal switch causes current to flow through said delay timer member and said first output to said warning light, and opening of said brake pedal switch causes current to flow from said first input, said delay timer member, said second output, and said first output to said warning light for a predetermined period of time.

6. A brake delay lighting system as described in claim 5, wherein:
   (a) said delay timer member adjustable to set a delay time of the predetermined time period as described.

7. A brake delay lighting system as described in claim 5, wherein:
   (a) said delay timer member includes a relay member connected to said first output and said second output operable on closing of said brake pedal switch to energize said relay member and cause current flow through said first output to said warning light to illuminate same.

8. A brake delay lighting system as described in claim 7, wherein:
   (a) on subsequent opening of said brake pedal switch, said relay member remains energized to cause current flow to keep said warning lights energized a predetermined, adjustable time period after the subsequent opening of said brake pedal switch.

9. A brake delay lighting system as described in claim 4, wherein:
   (a) said delay timer member includes a relay member connected to said second input and said first output; and
   (b) said brake lamps operable, on failure of said delay timer member, to permit current flow from said power source through said brake pedal switch, said second input, said relay contact member, said first output, and said warning light;

whereby said conventional vehicle brake lighting system continues to operate on failure of said brake delay lighting systems.

10. A brake delay lighting system as described in claim 9, wherein:
   (a) said delay timer member includes a relay member which is energized for a predetermined period of time after opening of said brake pedal switch to keep said warning light illuminated for subject predetermined time period.

11. A method of using a brake delay lighting system with a conventional vehicle brake lighting system including a power source; a brake pedal switch activated by a brake pedal and connected to the power source; and a warning light connected to the brake pedal switch through the brake delay lighting system, comprising:
   (a) closing of said brake pedal switch causes current flow to said warning light through said brake delay relay contact;
   (b) opening of said brake pedal switch causes initiation of time delay holding up relay in said brake delay lighting system to said warning light; and
   (c) deenergizing of said relay after a predetermined period of time causes current flow to said warning light to cease.

12. A method as described in claim 11 wherein:
   (a) closing of said brake pedal switch during the predetermined time period resets said brake delay lighting system so that subsequent opening of said brake pedal switch initiates the predetermined time period for a full delay-off time cycle.

* * * * *